(12) United States Patent
Ahn et al.

(10) Patent No.: US 11,494,443 B2
(45) Date of Patent: Nov. 8, 2022

(54) ELECTRONIC DEVICE FOR EXECUTING RECOMMENDED APPLICATION AND OPERATING METHOD THEREOF

(71) Applicant: SAMSUNG ELECTRONICS CO., LTD., Suwon-si (KR)

(72) Inventors: Sohmin Ahn, Suwon-si (KR); Donggoo Kang, Suwon-si (KR); Para Kang, Suwon-si (KR); Joohee Park, Suwon-si (KR); Sangchul Yi, Suwon-si (KR); Gulji Chung, Suwon-si (KR); Chouljun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/966,756

(22) PCT Filed: Jan. 31, 2019

(86) PCT No.: PCT/KR2019/001379
§ 371 (c)(1),
(2) Date: Jul. 31, 2020

(87) PCT Pub. No.: WO2019/151804
PCT Pub. Date: Aug. 8, 2019

(65) Prior Publication Data
US 2021/0042362 A1 Feb. 11, 2021

(30) Foreign Application Priority Data
Jan. 31, 2018 (KR) .................... 10-2018-0012392

(51) Int. Cl.
*G06F 3/0488* (2022.01)
*G06F 16/9035* (2019.01)
(Continued)

(52) U.S. Cl.
CPC ........ *G06F 16/9035* (2019.01); *G06F 3/0488* (2013.01); *G06F 3/167* (2013.01);
(Continued)

(58) Field of Classification Search
CPC ............... G06F 16/9035; G06F 3/0488; G06F 16/24578; G06F 9/451; G06F 9/546; G06F 3/167
See application file for complete search history.

(56) References Cited

U.S. PATENT DOCUMENTS 9,268,462 B2  2/2016  Civelli et al.
9,305,102 B2  4/2016  Duleba et al.
(Continued)

FOREIGN PATENT DOCUMENTS

JP         5808239         11/2015
KR    10-2004-0098500     11/2004
(Continued)

OTHER PUBLICATIONS

International Search Report for PCT/KR2019/001379 dated Apr. 12, 2019, 5 pages.
(Continued)

*Primary Examiner* — Anil K Bhargava
(74) *Attorney, Agent, or Firm* — Nixon & Vanderhye, P.C.

(57) ABSTRACT

Various embodiments of the present invention relate to an electronic device for executing a recommended application corresponding to a user input by using the user input, and an operating method thereof. An electronic device according to various embodiments of the present invention may comprise: an input module configured to receive a user input; a processor operatively connected to the input module; and a memory operatively connected to the processor, wherein the memory stores instructions that, when executed, cause the
(Continued)

processor to: receive a first input including a query through the input module; determine a recommended application matching the query among multiple applications installed in the electronic device; output an identification message for execution of the recommended application; receive a second input corresponding to the identification message; and execute the recommended application in response to reception of the second input.

20 Claims, 18 Drawing Sheets

(51) Int. Cl.
*G06F 9/451* (2018.01)
*G06F 16/2457* (2019.01)
*G06F 3/16* (2006.01)
*G06F 9/54* (2006.01)

(52) U.S. Cl.
CPC .............. *G06F 9/451* (2018.02); *G06F 9/546* (2013.01); *G06F 16/24578* (2019.01)

(56) References Cited

U.S. PATENT DOCUMENTS

| | | | | |
|---|---|---|---|---|
| 9,524,347 | B1* | 12/2016 | Jung | G06F 16/24578 |
| 9,589,033 | B1* | 3/2017 | Kuscher | G06F 16/951 |
| 2004/0158861 | A1 | 8/2004 | Terakado et al. | |
| 2010/0251231 | A1 | 9/2010 | Coussemaeker et al. | |
| 2014/0053088 | A1* | 2/2014 | Civelli | G06F 3/0484 |
| | | | | 715/760 |
| 2014/0188889 | A1* | 7/2014 | Martens | G06F 9/505 |
| | | | | 707/740 |
| 2014/0244634 | A1* | 8/2014 | Duleba | G06F 16/951 |
| | | | | 707/724 |
| 2015/0317559 | A1* | 11/2015 | Cronin | G06F 3/0484 |
| | | | | 706/46 |
| 2015/0324334 | A1* | 11/2015 | Lee | G06F 40/134 |
| | | | | 715/208 |
| 2015/0332373 | A1* | 11/2015 | Pang | G06Q 30/0631 |
| | | | | 705/26.7 |
| 2016/0055263 | A1 | 2/2016 | Haine et al. | |
| 2016/0179816 | A1* | 6/2016 | Glover | G06F 16/24578 |
| | | | | 707/767 |
| 2016/0188702 | A1* | 6/2016 | Lee-Goldman | G06F 16/3322 |
| | | | | 707/749 |
| 2016/0188721 | A1* | 6/2016 | Glover | G06F 16/951 |
| | | | | 707/706 |
| 2016/0306801 | A1* | 10/2016 | Andrianakou | G06F 16/285 |
| 2016/0357831 | A1* | 12/2016 | Linn | G06F 16/2228 |

FOREIGN PATENT DOCUMENTS

| | | |
|---|---|---|
| KR | 10-2011-0129436 | 12/2011 |
| KR | 10-1517659 | 4/2015 |
| KR | 10-2015-0128127 | 11/2015 |

OTHER PUBLICATIONS

Written Opinion of the ISA for PCT/KR2019/001379 dated Apr. 12, 2019, 9 pages.
Notification of Preliminary Rejection dated Apr. 5, 2022 in counterpart Korean Patent Application No. 10-2018-0012392 and English-language translation.
Notice of Final Rejection dated Sep. 2, 2022 in KR Application No. 10-2018-0012392 and English-language translation.

\* cited by examiner

|  | Criteria | Contents | Contextual Scores |
|---|---|---|---|
| 711 | Pre-defined | Application already mapped onto query manually | 70 |
| 712 | frequency | Frequency of searching or using application | 50 |
| 713 | recent use | Recently used application | 40 |
| 714 | pattern | Application having been executed by using a corresponding query by a user | 60 |
| 715 | recursire | Application searched by a query considering a tag | 30 |

ELECTRONIC DEVICE FOR EXECUTING RECOMMENDED APPLICATION AND OPERATING METHOD THEREOF

This application is the U.S. national phase of International Application No. PCT/KR2019/001379 filed Jan. 31, 2019 which designated the U.S. and claims priority to Korean Patent Application No. 10-2018-0012392 filed Jan. 31, 2018, the entire contents of each of which are hereby incorporated by reference.

TECHNICAL FIELD

Various embodiments of the disclosure relate to an electronic device for executing a recommended application corresponding to a user input by using the user input, and an operating method thereof.

BACKGROUND ART

As portable electronic devices such as smartphones are developing to have high performance, various services are provided through electronic devices. Specifically, the service domain is extended from basic services such as telephone call, texting, etc., to more complicated services such as games, messengers, editing documents, playing image/video, and editing. In addition, services provided through electronic devices are provided through applications installed in the electronic devices.

As services provided by electronic devices become more complicated, a user may manually set one or more functions to receive an intended service.

In addition, as there are many kinds of applications supporting the same service, a user may compare a plurality of applications and may execute a selected application according to a result of comparison in order to receive a desired service.

SUMMARY

As services provided through electronic devices are diversified and there are many kinds of applications supporting the same service, a user should operate multiple times to receive an intended service, which may cause inconvenience to the user. For example, an operation of manually setting one or more functions may cause user's inconvenience. In addition, as similar applications supporting the same service increase, users should endure inconvenience of having to select one application from the plurality of applications.

Various embodiments of the disclosure provide an apparatus and a method which can provide a service intended by a user through a least operation by reducing processes required to provide the service intended by the user.

The technical objects to be achieved by the disclosure are not limited to that mentioned above, and other technical objects that are not mentioned above may be clearly understood to those skilled in the art based on the description provided below.

According to various embodiments of the disclosure, an electronic device may include: an input module configured to receive an input of a user; a processor operatively connected with the input module; a memory operatively connected with the processor, and the memory may be configured to store instructions that, when being executed, cause the processor to: receive a first input including a query through the input module; determine a recommended application matching the query from among a plurality of applications installed in the electronic device; output a confirmation message for execution of the recommended application; receive a second input corresponding to the confirmation message; and execute the recommended application in response to the second input being received.

According to various embodiments of the disclosure, an operating method of an electronic device may include: receiving a first input including a query; determining a recommended application matching the query from among a plurality of applications installed in the electronic device; outputting a confirmation message for execution of the recommended application; receiving a second input corresponding to the confirmation message; and executing the recommended application in response to the second input being received.

The electronic device according to various embodiments of the disclosure can understand a service intended by a user by using information collected from a plurality of applications installed in the electronic device, and can provide the service intended by the user through a least operation.

BRIEF DESCRIPTION OF THE DRAWINGS

FIG. 7 is a view illustrating one or more predetermined criteria for determining a second application according to various embodiments of the disclosure;

DETAILED DESCRIPTION OF EXAMPLE EMBODIMENTS

Figure 1:
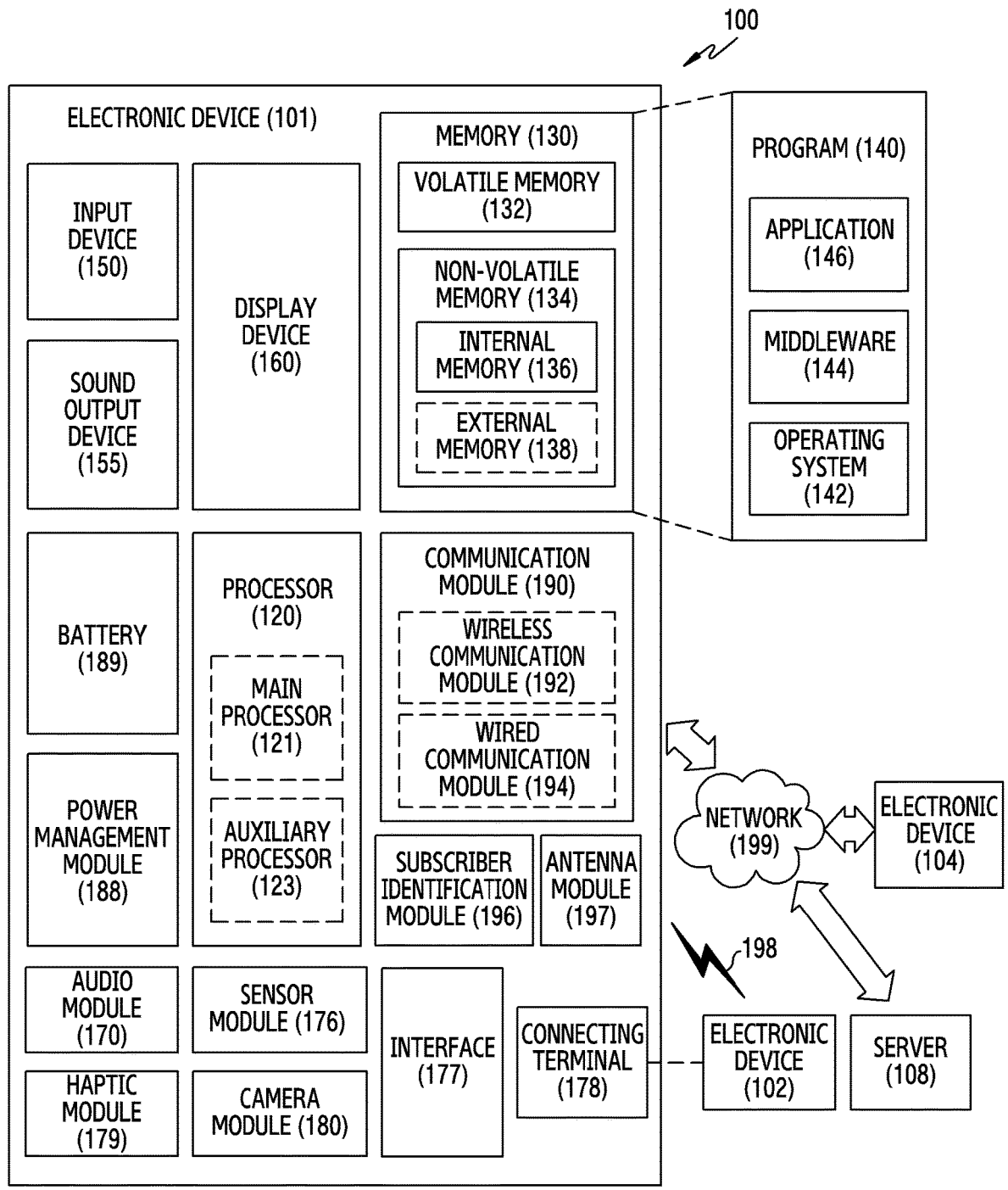
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminate sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminate sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, all or some of the operations executed in the electronic device 101 are executed using the model stored in the memory 130 of the electronic device 101 without through an external device, for example, the server 108 connected to the second network 199. For example, all or some of the operations executed in the electronic device 101 may use a rule-based model, or an artificial intelligence model trained according to at least one of a machine learning, neural network, or deep learning algorithm.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
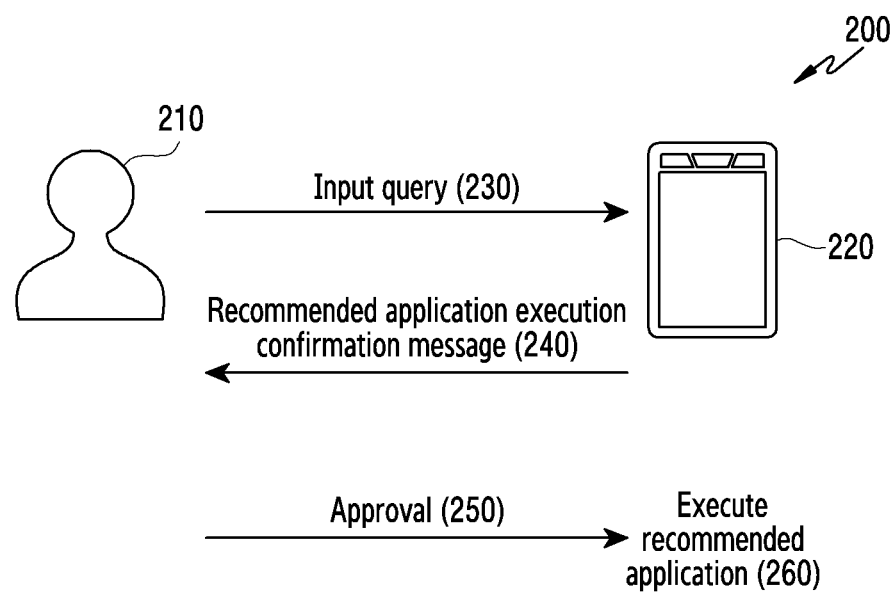
FIG. 2 is a view illustrating a system for executing a recommended application corresponding to a user input according to various embodiments of the disclosure.

FIG. 2 illustrates a system for executing a recommended application corresponding to a user input according to various embodiments of the disclosure.

Referring to FIG. 2, the system 200 for executing a recommended application corresponding to a user input may include a user 210 and an electronic device 220.

In an embodiment, the user 210 may be a user who receives an intended service by managing and operating the electronic device 220. For example, the user 210 may input a first input including a query to the electronic device 220 through a touch screen (for example, the display device 160 of FIG. 1).

In an embodiment, the electronic device 220 may be a device that provides a service desired by the user in response to a user input. In an embodiment, the electronic device 220 may be the electronic device 101. For example, the electronic device 220 may receive a text input including a query from the user through the touch screen 160. In another example, the electronic device 220 may receive a second input of approving execution of a recommended application after outputting an execution confirmation message of the recommended application. The electronic device 220 may execute the recommended application in response to the second input being received.

In an embodiment, the recommended application may be software or a program that is set (or executed) to perform a function corresponding to the service desired by the user. One or more recommended applications may be provided. For example, when the service desired by the user is "purchasing diapers," the recommended application may be the Amazon application, the eBay application. In another example, when the service desired by the user is "playing the music 'Try Everything' of Shakira," the recommended application may be the YouTube application, the Spotify application.

In an embodiment, the electronic device 220 may receive an input of a query from the user 210 (230). In an embodiment, the electronic device 220 may receive the first input including the query from the user 210. In an embodiment, the query may be one or more keywords for simply representing (or explaining) the service (or a function) desired by the user. In an embodiment, the query may be one or more words for simply representing a target action which is a set of a plurality of services (or a plurality of functions) desired by the user.

In an embodiment, the query may be a keyword. For example, when the service desired by the user is "purchasing diapers," the query may be "diapers" which is an item to be purchased. In another example, when the service desired by the user is "playing the music 'Try Everything' of Shakira," the query may be the song title, "Try Everything."

In an embodiment, the electronic device 220 may output a confirmation message regarding execution of the recommended application (240). In an embodiment, the confirmation message may be message for receiving a confirmation of (or an approval for) execution of the recommended application from the user 210. For example, the electronic device 220 may display an execution icon of the recommended application on a display (not shown), in another example, the electronic device 220 may output, through a speaker (not shown), a voice message for receiving an approval of execution of the recommended application from the user 210.

In an embodiment, the electronic device 220 may receive an input of an approval by the user 210 as to the confirmation message (250). For example, when the electronic device 220 displays the execution icon of the recommended application on the display, the electronic device 220 may receive an input of a touch input of the user on the execution icon. In another example, when the electronic device 220 outputs the voice message through the speaker, the electronic device 220 may receive a positive response voice message (for example, "Yes") of the user through a microphone (not shown).

In an embodiment, the electronic device 220 may execute the recommended application (260). The electronic device 220 may perform a specific function by executing the recommended application. For example, the electronic device 220 may play specific music (for example, 'Try Everything' of Shakira) by executing the YouTube application.

Figure 3:
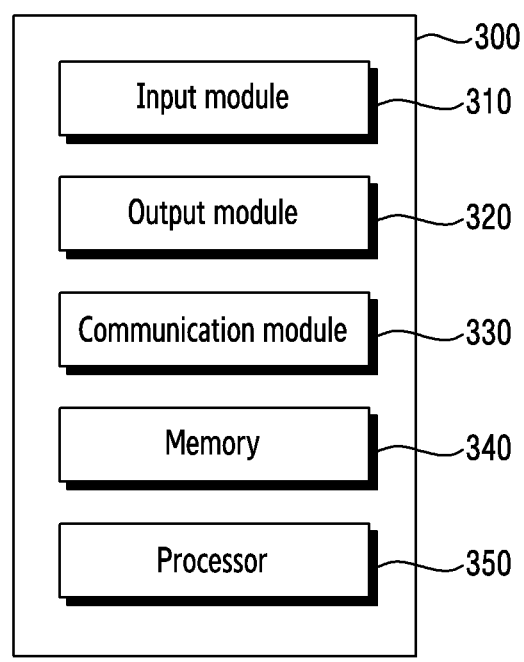
FIG. 3 is a block diagram of an electronic device according to various embodiments of the disclosure.

FIG. 3 is a block diagram of an electronic device according to various embodiments of the disclosure.

Referring to FIG. 3, the electronic device 300 may be the electronic device 220.

In an embodiment, the electronic device 300 may include an input module 310, an output, module 320, a communication module 330, a memory 340, and a processor 350.

In an embodiment, the input module 310 may receive various types of inputs from a user (for example, the user 210 of FIG. 2). In an embodiment, the input module 310 may be the input device 150. The input module 310 may receive a touch input (for example, tap, drag, flicking input, etc.) of the user. For example, the input module 310 may be a touch screen display. The input module 310 may receive a voice input of the user. For example, the input module 310 may be a microphone.

In an embodiment, the output module 320 may output information or data in various forms to the user. The output module 320 may display information on a recommended application on a screen. For example, the output module 320 may be the display device 160. The output module 320 may output a confirmation message for execution of the recommended application in the form of a voice message. For example, the output module 320 may be the sound output device 155.

In an embodiment, the communication module 330 may establish a wired or wireless communication channel between the electronic device 300 and an external electronic device (for example, a server (not shown)), and may support communication through the established communication channel. In an embodiment, the communication module 330 may be the communication module 190. For example, the electronic device 300 may determine a recommended application (for example, the Amazon application) and a function (for example, a goods purchasing function) to be performed through the recommended application, and then may receive information regarding one or more entities (for example, a payment method, delivery information, a cost, an item to be purchased), which are required to be set to perform the function, from the server through the communication module 330.

In an embodiment, the memory 340 may at least temporarily store data obtained or generated in the electronic device 300, or data received from an external electronic device, under control of the processor 350. For example, the memory 340 may store log data of one or more applications installed in the electronic device 300. In an embodiment, the memory 340 may store a program for performing specific computation or a set of instructions. For example, the memory 340 may store a program for determining a recommended application matching a query when the electronic device 300 receives a first input including the query from a user.

In an embodiment, the processor 350 may control overall operations of the electronic device 300. In an embodiment, when the processor 350 receives the first input including the query through the input module 310, the processor 350 may search log data of applications stored in the memory 340 in order to determine a recommended application matching the query. In another embodiment, when the recommended application is determined, the processor 350 may generate a confirmation message for execution of the recommended application. In still another embodiment, when a positive response of the user as to the confirmation message is received, the processor 350 may execute the recommended application.

Figure 4:
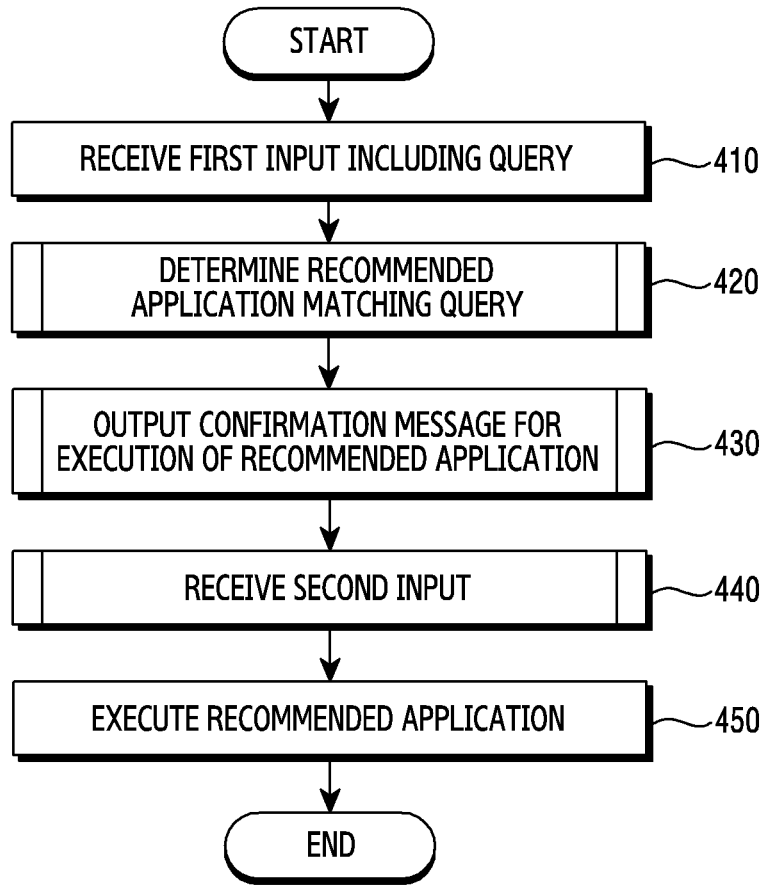
FIG. 4 is a flowchart of an electronic device according to various embodiments of the disclosure.

FIG. 4 is a flowchart of an electronic device according to various embodiments of the disclosure.

An operating entity of FIG. 4 may be an electronic device (for example, the electronic device 300 of FIG. 3) or the processor 350 of the electronic device 300.

In operation 410, the electronic device 300 may receive a first input including a query. In an embodiment, the electronic device 300 may display a user interface (for example, a search window 1030 of FIG. 10) to receive a text input of a user. The electronic device 300 may receive a text input including a query through the search window 1030. In another embodiment, the electronic device 300 may receive a voice input of the user including the query through a microphone.

In an embodiment, the query may be one or more keywords for simply representing a service desired by the user. In an embodiment, the query may be a keyword. For example, when the service desired by the user is "purchasing diapers," the query may be "diapers" which is an item to be purchased.

In operation 420, the electronic device 300 may determine a recommended application matching the query. In an embodiment, the recommended application may be software or a program that is set to perform a function corresponding to the service desired by the user. In an embodiment, the electronic device 300 may determine the recommended application matching the query through at least one of literal matching or contextual matching. For example, the electronic device 300 may determine an application in log data of which a text, corresponding to the query is included, from among a plurality of applications installed in the electronic device 300 (literal matching). The plurality of applications may include an application that is provided by default even if it is not installed by the user (for example, a memo, contact, an application store, etc.), and an application directly installed by the user.

In another example, the electronic device 300 may determine an application that is determined to be best suited for the intention of the user who inputs the query in the current context, according to a history of the user of having used the application previously and current context information (contextual matching). In an embodiment, the electronic device 300 may determine the recommended application matching the query by using both the literal matching and the contextual matching. For example, the electronic device 300 may perform contextual matching with respect to applications which are obtained through literal matching.

For example, when the query is "diapers," the electronic device 300 may determine three applications (for example, the Amazon application, a mail application, a mobile payment application) in log data of which "diapers" is included, from among the plurality of applications installed in the electronic device 300. The electronic device 300 may determine, as the recommended application matching "diaper," the Amazon application which is determined to be best suited for the intention of the user in the current context from among the three applications.

In operation 430, the electronic device 300 may output a confirmation message for execution of the recommended application. In an embodiment, the confirmation message may be a message for receiving a confirmation of (or an approval for) execution of the recommended application from the user. For example, when a positive response of the user as to the confirmation message is received, the electronic device 300 may execute the recommended application.

In an embodiment, the confirmation message may include a name of the recommended application, a function to be performed through the recommended application, and one or more values regarding the function to be performed through the recommended application. For example, the confirmation message may include information indicating that the function of purchasing goods online will be performed by using the Amazon application, which is the recommended application, when the user inputs the positive response to the electronic device 300. In another example, the confirmation message may additionally include information regarding an item to be purchased (diapers), a cost (12 dollars), a delivery address (an address pre-stored as a company in the memory 340).

In an embodiment, the confirmation message may be outputted in various formats. For example, the confirmation message may be displayed on the display in a text or graphic format. In another example, the confirmation message may be outputted through a speaker in a sound format.

In an embodiment, when one or more values regarding the function to be performed through the recommended application are not determined, the electronic device 300 may not output the confirmation message for execution of the recommended application.

In operation 440, the electronic device 300 may receive a second input. In an embodiment, the second input may be a user input corresponding to the confirmation message. In an embodiment, the second input may be an input of approving execution of the recommended application (positive response) or an input of interrupting execution of the recommended application (negative response). In another embodiment, the second input may be an input of requesting additional information to approve or interrupt execution of the recommended application.

For example, when an execution icon for execution of the recommended application is included in the confirmation message, the electronic device 300 may detect a touch input (approval for execution of the recommended application) of the user on the execution icon. In another example, when the confirmation message is outputted through the speaker in the sound format, the electronic device 300 may receive a positive response voice message (for example, "Yes") of the user through a microphone within a designated time from the output of the confirmation message.

In another example, when the confirmation message is outputted through the speaker in the sound format, the electronic device 300 may receive a negative response voice message of the user through the microphone within the designated time from the output of the confirmation message. When the electronic device 300 does not receive the positive response voice message of the user within the designated time from the output of the confirmation message, the electronic device 300 may process in the same way as when the negative response voice message of the user is received.

In operation 450, the electronic device 300 may execute the recommended application. In an embodiment, the electronic device 300 may execute the recommended application in response to the second input of approving execution of the recommended application being received. For example, the electronic device 300 may execute the recommended application in response to the touch input of the user on the execution icon included in the confirmation message being detected.

Figure 5:
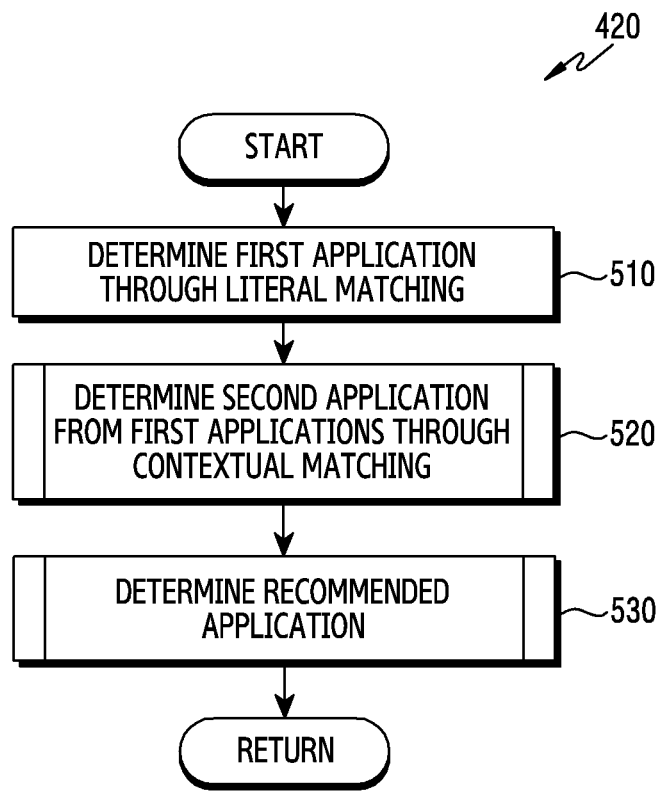
FIG. 5 is a flowchart of an electronic device according to various embodiments of the disclosure.

FIG. 5 is a flowchart of an electronic device according to various embodiments of the disclosure.

An operation entity of FIG. 5 may be an electronic device (for example, the electronic device 300 of FIG. 3) or the processor 350 of the electronic device 300.

FIG. 5 is a detailed sequence diagram of operation 420 of FIG. 4.

In operation 510, the electronic device 300 may determine a first application through literal matching.

In an embodiment, the literal matching may be an operation of determining an application in log data of which a text corresponding to a query is included, from among a plurality of applications installed in the electronic device 300.

In an embodiment, log data of a specific application may include accumulative records of the specific application having been used by a user or the electronic device 300 up to the present time, since the specific application was installed in the electronic device 300. For example, when the specific application is a messaging application, log data may include data regarding one or more messages exchanged between the user and another user. In another example, when the specific application is the YouTube application, log data may include connection information of the user (for example, a URL accessed by the user, a connect time, etc.), information of a content reproduced by the user (for example, a title of a video or music, etc.). In another example, when the specific application is a music playing application, log data may include information (for example, a song title or a singer) regarding music included in a music list of the music playing application, or currently included, in still another example, when the specific application is an image view application, log data may include data that is obtained through a vision recognition result.

In an embodiment, the electronic device 300 may determine one or more first applications through literal matching (or by performing literal matching). In an embodiment, the first application may be an application that is determined to include a text corresponding to a query in log data.

For example, when a first, input including a query such as "diapers" is received, the electronic device 300 may determine five first applications (for example, a music playing application, a mail application, a messaging application, an image view application, the Amazon application). For example, the electronic device 300 may determine the music playing application as the first application in response to a song including "diapers" (for example, Diapers of Ray Romano) being searched from songs included in a list of the music playing application, in another example, the electronic device 300 may determine the Amazon application as the first application in response to a purchase history including "diapers" being searched in the previous purchase history of the Amazon application. In still another example, the electronic device 300 may determine the messaging application as the first application in response to a message including "diapers" being searched from messages exchanged through the messaging application.

In operation 520, the electronic device 300 may determine a second application from the first applications through contextual matching.

In an embodiment, the contextual matching may be a process (or an operation, an algorithm) of determining an application that is determined to be best suited for an intention of the user who inputs the query in the current context, considering a user's history of having used the application previously and current context information.

In an embodiment, the electronic device 300 may perform contextual matching for a candidate group of designated applications. For example, the electronic device 300 may perform contextual matching with respect to all applications included in the electronic device 300. In another example, the electronic device 300 may perform contextual matching with respect to the first applications which are the result of literal matching.

In an embodiment, the electronic device 300 may determine whether one or more predetermined criteria are satisfied with respect to the candidate group of the applications. In an embodiment, the one or more predetermined criteria may be related to a user's previous using history. For example, the one or more predetermined criteria may include presence or absence of a mapping relationship, the number of times (for example, the number of times of using, the number of times of searching, etc.), and recent use. This will be described in detail below with reference to FIGS. 6 and 7.

In an embodiment, the electronic device 300 may determine one or more second applications through contextual matching (or by performing contextual matching). In an embodiment, the second application may indicate one or more applications that are determined to satisfy a predetermined condition as a result of performing context matching. For example, the electronic device 300 may give a contextual score to each of the candidate group of applications according to whether each application satisfies the one or more predetermined criteria. When a score given to the Amazon application exceeds a reference value, the electronic device 300 may determine the Amazon application as the second application.

In an embodiment, operation 520 may be omitted. For example, when the number of first applications determined by operation 510 is 1, operation 520 may be omitted. However, even when the number of first applications determined by operation 510 is 1, operation 520 may not be omitted and it may be determined whether the one first application satisfies a predetermined condition (for example, when a contextual score given to the one first application exceeds a reference value).

In operation 530, the electronic device 300 may determine a recommended application. In an embodiment, the electronic device 300 may determine the recommended application on the basis of the second application. For example, the electronic device 300 may determine the second application as the recommended application.

In an embodiment, the electronic device 300 may determine the recommended application in consideration of the number of second applications. For example, when the number of second applications is 1, the second application may be determined as the recommended application. In another example, when the number of second applications is two or more, one application selected from the second applications (for example, an application having the highest contextual score) may be determined as the recommended application. In still another example, when the number of second applications is two or more, all of the two or more second applications may be determined as the recommended applications.

In an embodiment, the electronic device 300 may determine that there does not exist a recommended application. For example, when there does not exist the second application (for example, contextual scores given to all of the applications included in the candidate group do not exceed the reference value), the electronic device 300 may determine that there does not exist a recommended application.

Figure 6:
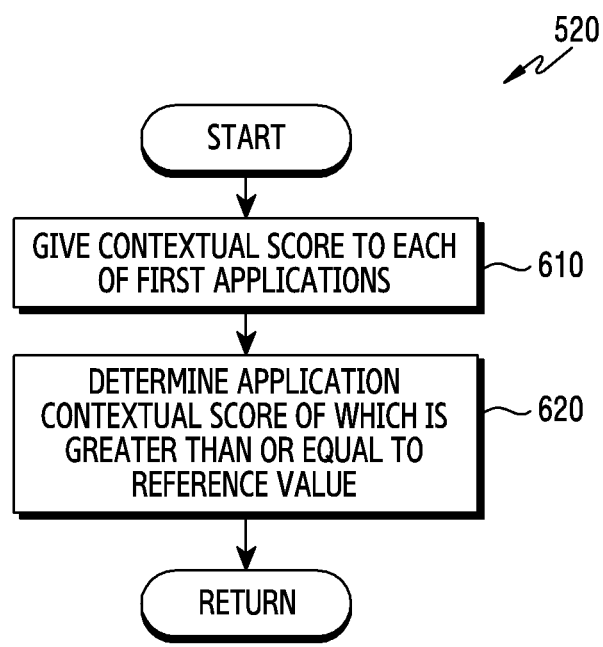
FIG. 6 is a flowchart of an electronic device according to various embodiments of the disclosure.

FIG. 6 is a flowchart of an electronic device according to various embodiments of the disclosure.

An operating entity of FIG. 6 may be an electronic device (for example, the electronic device 300 of FIG. 3) or the processor 350 of the electronic device 300.

FIG. 6 is a detailed sequence diagram of operation 520 of FIG. 5.

In operation 610, the electronic device 300 may give a contextual score to each of first applications.

In an embodiment, the contextual score may be a value that is given to a specific application according to whether the specific application satisfies one or more predetermined criteria. In an embodiment, the one or more predetermined criteria may be related to a user's previous using history. For example, the one or more predetermined criteria may include presence or absence of a mapping relationship, the number of times (for example, the number of times of using, the number of times of searching, etc.), recent, use, etc. For example, when the specific application is set to have a mapping relationship with a query (for example, "diapers") received in operation 410, a contextual score of 70 may be given to the specific application. In another example, when the frequency of using the specific application exceeds a reference value, a contextual score of 50 may be given to the specific application.

In an embodiment, the electronic device 300 may give a contextual score to each of the first applications by using a database related to a user's operating history stored in the memory 340. The database related to the user's operating history may be accumulative data related to operations performed by the electronic device 300 by user's operation within a designated time period. For example, the database related to the user's operating history may include log data of one or more applications installed in the electronic device 300. In another example, the database related to the user's operating history may be a database that is established by integrating log data of one or more applications installed in the electronic device 300 into one data. In still another example, the database related to the user's operating history may include matching relationship information between queries and recommended applications, which is accumulated in the memory 340 according to various embodiments of the disclosure (for example, information indicating that when "diapers" was inputted, the Amazon application was executed three times according to an embodiment of the disclosure).

In an embodiment, the electronic device 300 may give a contextual score to each of the first applications by using a database related to the user's operating history, which is stored in an external device (not shown) (for example, a server), For example, the electronic device 300 may connect to an external device to give a contextual score to each of the first applications every time a first input including a query is received. In another example, before the first input including the query is received, the electronic device 300 may periodically connect to the external device, and may receive at least a portion of the database related to the user's operating history.

In operation 620, the electronic device 300 may determine an application the contextual value of which is greater than or equal to a reference value. In an embodiment, the electronic device 300 may give a contextual score to each of the first applications with respect to all of the predetermined criteria, and then may determine an application the contextual score of which is greater than or equal to the reference value. In an embodiment, the application given the contextual value greater than or equal to the reference value may be determined as the second application.

FIG. 7 illustrates one or more predetermined criteria to determine the second application according to various embodiments of the disclosure.

In an embodiment, one or more criteria 710, details 720, contextual scores 730 are illustrated. In an embodiment, the details 720 may provide explanation of the one or more criteria 710. The contextual scores 730 may refer to scores that are given to applications satisfying the one or more criteria 710.

In an embodiment, the one or more criteria 710 may include a pre-defined criterion 711, a frequency criterion 712, a recent use criterion 713, a pattern criterion 714, and a recursive criterion 715.

In an embodiment, the pre-defined criterion 711 may be a criterion related to a specific operation or function set to have a matching relationship with a query before the first input including the query is received.

For example, the user may match the query "diapers" to the operation of purchasing "diapers" beforehand. That is, the user may set beforehand to perform the operation of "purchasing diapers" when the query "diapers" is inputted. In an embodiment, the electronic device 300 may give a contextual score of a designated value to an application that can perform the operation pre-set by the user. For example, the electronic device 300 may give a contextual score of 70 to the Amazon application which can perform the pre-set operation, such as "purchasing diapers." When there is no application that can perform the pre-set operation such as "purchasing diapers," the electronic device 300 may not provide information regarding a recommended application to the user.

In another example, the user may explicitly designate an application (for example, the Amazon application) to be executed to perform the operation of "purchasing diapers" when the query "diapers" is inputted. The electronic device 300 may give a contextual score of 80 to the explicitly designated application.

In an embodiment, the frequency criterion 712 may be a criterion related to the frequency of using an application, or the frequency of searching.

In an embodiment, the electronic device 300 may give a contextual score of a designated value to an application the frequency of using or searching of which is greater than or equal to a predetermined value. For example, when the frequency of using the Amazon application is 30 times, the frequency of using the eBay application is 25 times, and the predetermined value is 20 times, the electronic device 300 may give a contextual score of 50 to the Amazon application and the eBay application.

In an embodiment, the electronic device 300 may give a contextual score in proportion to the frequency of using or the frequency of searching. For example, when the frequency of using the Amazon application is 30 times and the frequency of using the eBay application is 25 times, the electronic device 300 may give a contextual score of 60 to the Amazon application and may give a contextual score of 50 to the eBay application.

In an embodiment, the frequency criterion 712 may be a criterion related to how often a specific application performs an operation related to a query. For example, when the query is "Try Everything" and the number of times of playing the music "Try Everything" by a music playing application exceeds a reference value, a contextual score of 60 may be given to the music playing application. For example, when the number of times of performing the operation related to the query exceeds the reference value, the electronic device 300 may give a higher score than that given when the number of times of simply using the application exceeds a reference value.

In an embodiment, the recent use criterion 713 may be a criterion related to whether there is a history of having used within a designated period (for example, one week) from the present time.

In an embodiment, the electronic device 300 may give a contextual score of a designated value to an application which has been used within a designated period from the present time. For example, when the Amazon application has been used within one week, the electronic device 300 may give a contextual score of 40 to the Amazon application.

In an embodiment, the pattern criterion 714 may be a criterion related to an application, which has been performed in relation to the query before the first input including the query is received. For example, when there is a history of having performed a specific application (for example, the Amazon application) using the query (for example, "diapers") before the first input including the query is received, a contextual score of 60 may be given to the specific application. In another example, when a first application and a second application are continuously used by using the query (for example, "diapers"), the contextual score of 60 may be given to the second application.

Although FIG. 7 illustrates that the one or more predetermined criteria 710 include five criteria, this is merely an example and do not limit the right scope. Accordingly, there may be other various criteria that are not illustrated in FIG. 7. For example, a contextual score of a designated value may be given to an application the use time of which exceeds a reference value.

Figure 8:
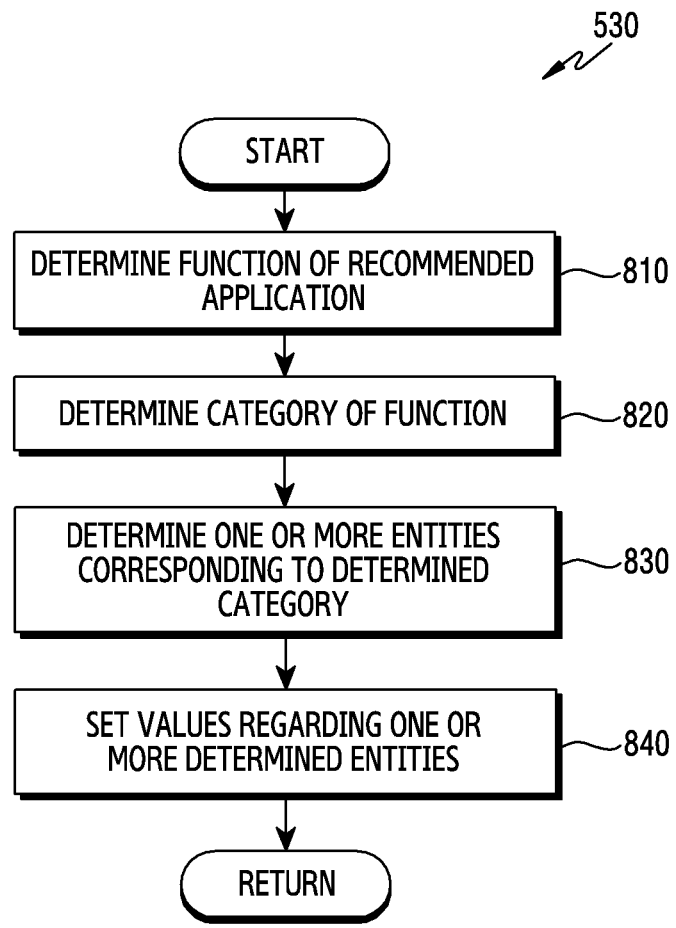
FIG. 8 is a flowchart of an electronic device according to various embodiments of the disclosure.

FIG. 8 is a flowchart of an electronic device according to various embodiments of the disclosure.

An operating entity of FIG. 8 may be an electronic device (for example, the electronic device 300 of FIG. 3) or the processor 350 of the electronic device 300.

FIG. 8 is a detailed sequence diagram of operation 530 of FIG. 5.

In operation 810, the electronic device 300 may determine a function of a recommended application.

In an embodiment, the electronic device 300 may determine one function from among a plurality of functions to be performed by the recommended application. For example, when the recommended application is a music playing application, one function (for example, a music playing function) may be determined from among the plurality of functions (for example, the music playing function, a music sharing function, etc.) to be performed by the music playing application.

In an embodiment, the electronic device 300 may determine one function from among the plurality of functions to be performed by the recommended application, on the basis of one or more criteria (for example, the pattern criterion 714 of FIG. 7) satisfied by the recommended application. For example, when the recommended application is the Amazon application and the user has a history of having performed the goods purchasing function with the Amazon application using the query (for example, "diapers"), the electronic device 300 may determine one function (for example, the goods purchasing function) from among the plurality of functions (for example, the goods purchasing function, a gift giving function, etc.) to be performed by the Amazon application.

In operation 820, the electronic device 300 may determine a category of the function, in an embodiment, the electronic device 300 may determine the category of the function determined in operation 810. In an embodiment, the category of the function may be a category for classifying the function to be performed by the recommended application according to contents of the function (for example, a subject or an operation to be performed). For example, the category may include at least one of commerce, music, video, game, fitness, transport, finance according to the subject. In another example, the category may include at least, one of playing, sharing, displaying sending, setting according to the operation to be performed. For example, the electronic device 300 may determine the category of the "goods purchasing function" of the Amazon application as commerce. In another example, the electronic device 300 may determine the category of the "music playing function" of the music playing application as music.

The electronic device 300 may determine a category of the recommended application, not the category of the function, although it is not illustrated. In an embodiment, applications performing the same or similar functions may be grouped into the same category. For example, applications (for example, the Amazon application, the eBay applications, etc.) performing the function of purchasing goods may be grouped into the commerce category. In another example, applications (for example, a music playing application, the Spotify application, the Melon application) performing the music playing function (for example, a local sound source or a streaming sound source) may be grouped into the music category. In still another example, applications (for example, the YouTube application, the Netflix application) performing a video playing function (for example, a local video or a streaming video) may be grouped into the video category.

In operation 830, the electronic device 300 may determine one or more entities corresponding to the determined category.

In an embodiment the category of the function determined in operation 820 may correspond to one or more entities that need to be set to perform the function determined in operation 810. The number of one or more entities or contents thereof may vary according to the category determined in operation 820. For example, the commerce category may correspond to entities such as a seller, an item, an address, billing, a cost, etc. In another example, the music category may correspond to entities such as a title, an artist, an output device.

In an embodiment, the one or more entities may be represented in a template form.

In an embodiment, the electronic device 300 may load a template pre-stored in the memory 340. For example, the memory 340 may store template information corresponding to the plurality of categories. The electronic device 300 may load template information corresponding to the category (for example, the commerce category) determined in operation 820.

In another embodiment, the electronic device 300 may receive, from an external device (not shown) (for example, a server), information regarding one or more entities corresponding to the determined category. For example, the electronic device 300 may receive template information corresponding to the commerce category from the server.

Table 1 presented below show an example of information regarding a template corresponding to the commerce category, stored in the memory 340 or received from a server.

TABLE 1

| Entity | Reference to | Value |
| --- | --- | --- |
| Seller | Mail/Message | |
| Item | Mail/Message | |
| Address | Contact/Message | |
| Billing | Samsung pay/Calendar/Message | |
| Cost | Samsung pay/Mail/Message | |

Referring to table 1, the template may include one or more entities (for example, a seller, an item, an address, billing, a cost), values related to the one or more entities, information of an application to be referenced (or searched) to determine values of the one or more entities (Reference to). For example, the template may include information on an application to be referenced (for example, a mail application, a message application) to determine a value related to the entity of the item to be purchased.

In an embodiment, the one or more entities and the information regarding applications to be referenced to determine values of the one or more entities may be included in the received (or loaded) template, and the values related to the one or more entities may be empty.

In operation 840, the electronic device 300 may set values regarding the one or more entities determined in operation 830. For example, when the category of the function is determined as the commerce category, the electronic device 300 may determine a value regarding the one or more entities (for example, an item) (for example, "Huggies baby diapers").

In an embodiment, the electronic device 300 may determine values regarding the one or more entities from log data of one or more applications installed in the electronic device 300.

In an embodiment, an application referring to log data to determine values regarding the one or more entities may be the same as or different from an application referring to log data to determine a recommended application.

For example, the electronic device 300 may receive template information corresponding to the commerce category from the server. The electronic device 300 may fill an empty space in the received template on the basis of log data of one or more applications installed in the electronic device 300. In an embodiment, the electronic device 300 may obtain a seller selling diapers, or a name of an open market which brokers selling of diapers, from log data of the mail application or the message application. For example, when the user has a history of having purchased diapers through the Amazon application previously, and a diaper purchase confirmation message is included in the log data of the message application, the electronic device 300 may obtain "Amazon" as the name of the open mark brokering selling of diapers from the diaper purchase confirmation message. In addition, the electronic device 300 may obtain "diapers" as the name of the purchased item or various conditions (for example, a brand name, a size, a suggested age, etc.) for limiting diapers, from the purchase confirmation message.

In an embodiment, the electronic device 300 may obtain information regarding a delivery address of the purchased item from contact or the log data of the message application. For example, the electronic device 300 may obtain information of the address of the user (for example, home or a company) stored in the contact. In another example, the electronic device 300 may obtain information regarding an address which was determined as a destination when the user previously ordered diapers, from the purchase confirmation message.

In an embodiment, the electronic device 300 may obtain information regarding how payment of the item to be purchased will be made from log data of a mobile payment application (for example, the Samsung pay application), a calendar, or a message application. The electronic device 300 may obtain information regarding a payment method. For example, the electronic device 300 may obtain credit card information of the user which is registered at the Samsung pay application. In another example, the electronic device 300 may obtain information regarding a payment method that was used when the user previously ordered diapers, from the purchase confirmation message.

In an embodiment, the electronic device 300 may obtain information regarding a cost for the item to be purchased from log data of the mobile payment application, the message application, or the mail application. For example, the electronic device 300 may search a record of having purchased diapers through the Amazon application in a previous payment history of the mobile payment application, and may obtain information regarding the cost of diapers from the result of searching.

In an embodiment, in determining a value regarding a specific entity (for example, a cost), the electronic device 300 may consider priority of an application to search log data. For example, the electronic device 300 may search log data of the mobile payment application, first, in determining a value regarding the cost or payment entity. In another example, the electronic device 300 may search log data of the contact, first, in determining a value regarding the address entity. In an embodiment, when the electronic device 300 receives template information corresponding to the determined category from the server, priority information of the application may be included in the template information received from the server.

In an embodiment, the electronic device 300 may determine values regarding the one or more entities, on the basis of sensing information which is obtained from one or more sensors (for example, the sensor module 176 of FIG. 1) included in the electronic device 300. For example, when a function to be performed through the recommended application is a music playing function, and there are two output devices having a history of having been connected with the electronic device 300 through Bluetooth (for example, an output device positioned in a company and an output device positioned in home), the electronic device 300 may determine a value regarding the output device entity on the basis of position information of the electronic device 300 which is obtained from a GPS sensor.

Figure 9:
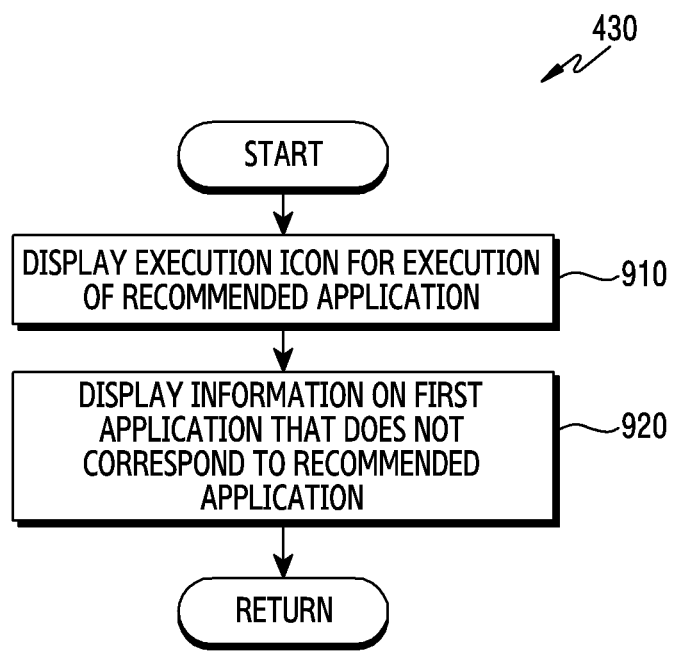
FIG. 9 is a flowchart of an electronic device according to various embodiments of the disclosure.

FIG. 9 is a flowchart of an electronic device according to various embodiments of the disclosure.

An operating entity of FIG. 9 may be an electronic device (for example, the electronic device 300 of FIG. 3) or the processor 350 of the electronic device 300.

FIG. 9 is a detailed sequence diagram of operation 430 of FIG. 4.

In operation 910, the electronic device 300 may display an execution icon of a recommended application.

In an embodiment, the execution icon of the recommended application may be a visual object for receiving a positive response of the user as to execution of the recommended application. In an embodiment, the execution icon may include a text or graphic object. For example, when the electronic device 300 detects a user touch input on the execution icon of the recommended application, the electronic device 300 may execute the recommended application (for example, the Amazon application) to perform a specific function (for example, purchasing diapers).

In an embodiment, the electronic device 300 may display one or more additional objects along with tide execution icon of the recommended application. The one or more additional objects may include a text or graphic object. For example, the electronic device may include a text object indicating the name of the recommended application, a function to be performed through execution of the recommended application, one or more entities for performing the function, and values regarding the one or more entities.

In an embodiment, the electronic device 300 may arrange the execution icon of the recommended application and the one or more additional objects within one area. For example, the electronic device 300 may arrange the execution icon of the recommended application and the one or more additional objects within a rectangular area which reminds the user of a card.

In operation 920, the electronic device 300 may display information regarding a first application that does not correspond to the recommended application.

For example, when the electronic device receiving a first input including a query such as "diapers" determines five first applications (for example, a music playing application, a mail application, a messaging application, an image view application, the Amazon application), and determines the Amazon application as the recommended application, the electronic device 300 may display at least, one of pieces of information regarding the music playing application, the mail application, the messaging application, the image view application.

In an embodiment, the electronic device 300 may additionally display the information regarding the first application while maintaining display of the execution icon of the recommended application.

In an embodiment, the information regarding the first application may include information regarding log data of the first application matching the query (for example, "diapers"). For example, when the user has the history of having purchased diapers previously through the Amazon application and a diaper purchase confirmation mail is included in log data of the mail application, the electronic device 300 may display a portion of the diaper purchase confirmation mail that includes "diapers" in the form of a text or an image.

In various embodiments, the information regarding the first application may not include an execution icon for executing the first application. For example, the electronic device 300 may only display a portion of log data of the mail application, and may not include an execution icon for executing the mail application. According to various embodiments of the disclosure, since the electronic device executes an application intended by the user through a least user operation, the electronic device 300 may not provide an execution icon for executing an application that is not determined as the application intended by the user.

Figure 10:
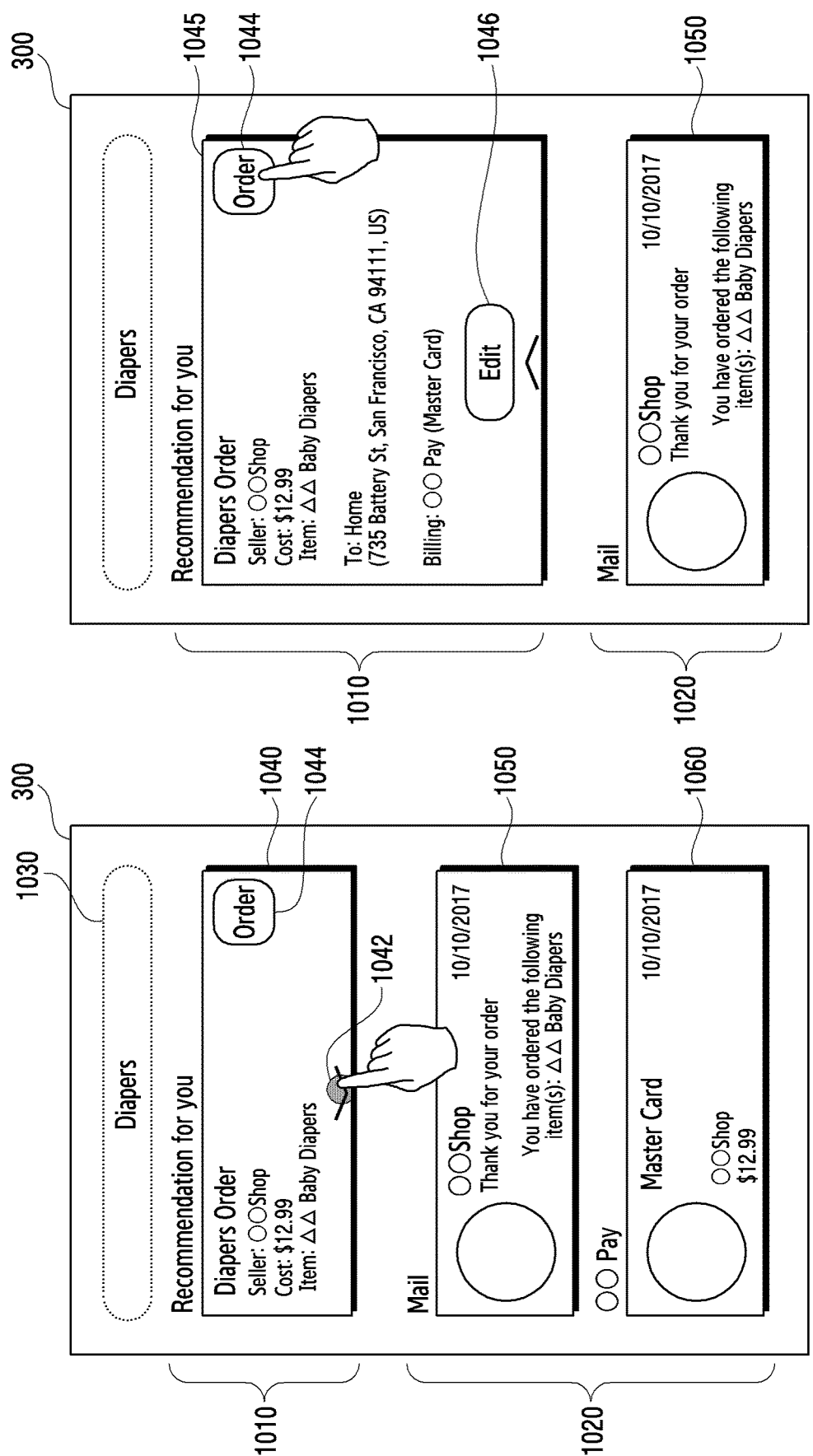
FIG. 10 is a view illustrating user interfaces according to various embodiments of the disclosure.

FIG. 10 is a view illustrating user interfaces according to various embodiments of the disclosure.

The left view of FIG. 10 is a view displaying an execution icon for executing a recommended application and information regarding an application that does not correspond to the recommended application from among first applications.

In an embodiment, the electronic device 300 may provide a search window 1030 to receive a user input. In an embodiment, the electronic device 300 may receive an input of a text or an image from a user through the search window 1030. For example, the electronic device 300 may receive a text input, such as "diapers" from the user through the search window 1030. Herein, "diapers" may be referred to as a "query," and the text input may be referred to as a "first input."

In an embodiment, the electronic device 300 may determine a recommended application matching the query. For example, the electronic device 300 may determine three first applications (for example, the Amazon application, a mail application, the Samsung pay application) in log data of which a text corresponding to the query is included. The electronic device 300 may determine the Amazon application as the recommended application from among the three first applications.

In an embodiment, the electronic device 300 may display a recommendation search result 1010 and a non-recommendation search result 1020. The recommendation search result 1010 may correspond to one area 1040 in which an execution icon 1044 of the recommended application and one or more additional objects (for example, text objects indicating a seller, a cost, an item) are arranged. The non-recommendation search result 1020 may correspond to a plurality of areas 1050, 1060 in which information regarding the first applications that do not correspond to the recommended application is arranged. For example, information regarding the Amazon application corresponding to the recommended application may be displayed in the area 1040. In another example, information regarding the mail application which does not correspond to the recommended application may be displayed in the area 1050, and information regarding the Samsung pay application that does not correspond to the recommended application may be displayed in the area 1060.

In an embodiment, the electronic device 300 may further display a view more object 1042 to display information that is not displayed in the current area 1040 due to a limit to the size of the area 1040. For example, when the electronic device 300 detects a user touch input the view more object 1042, the electronic device 300 may display an extended area 1045 to display all set values (for example, values regarding the seller, cost, item, address, payment entities) regarding the function to be performed through the recommended application.

In an embodiment, the electronic device 300 may further display an edit object 1046 to edit the set values regarding the function to be performed through the recommended application. The edit object 1046 may be displayed in the area before the area is extended (for example, the area 1040), although this is not illustrated. For example, when a user touch input on the edit object 1046 is detected, the electronic device 300 may display a user interface for selecting an entity to be edited in the form of a pop-up window, and may display a user interface for receiving an input of a new value on the selected entity.

Figure 11A:
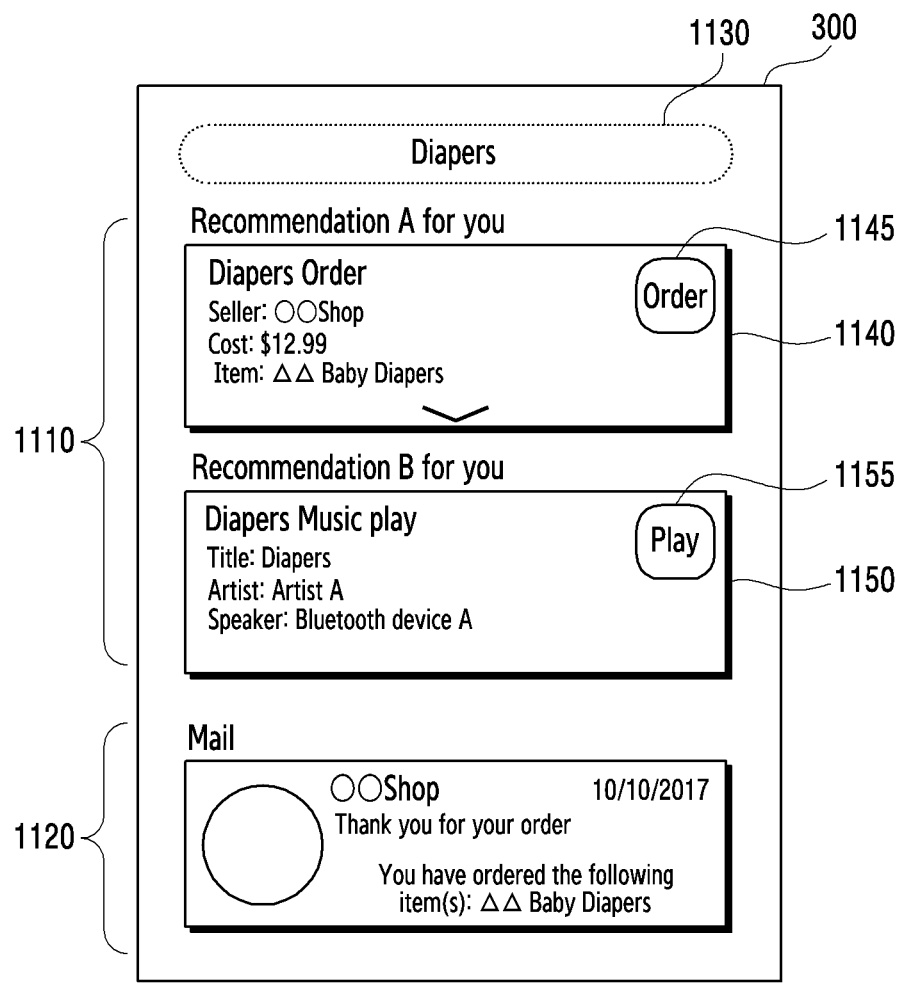
FIGS. 11A and 11B are views illustrating user interfaces according to various embodiments of the disclosure.
Figure 11B:
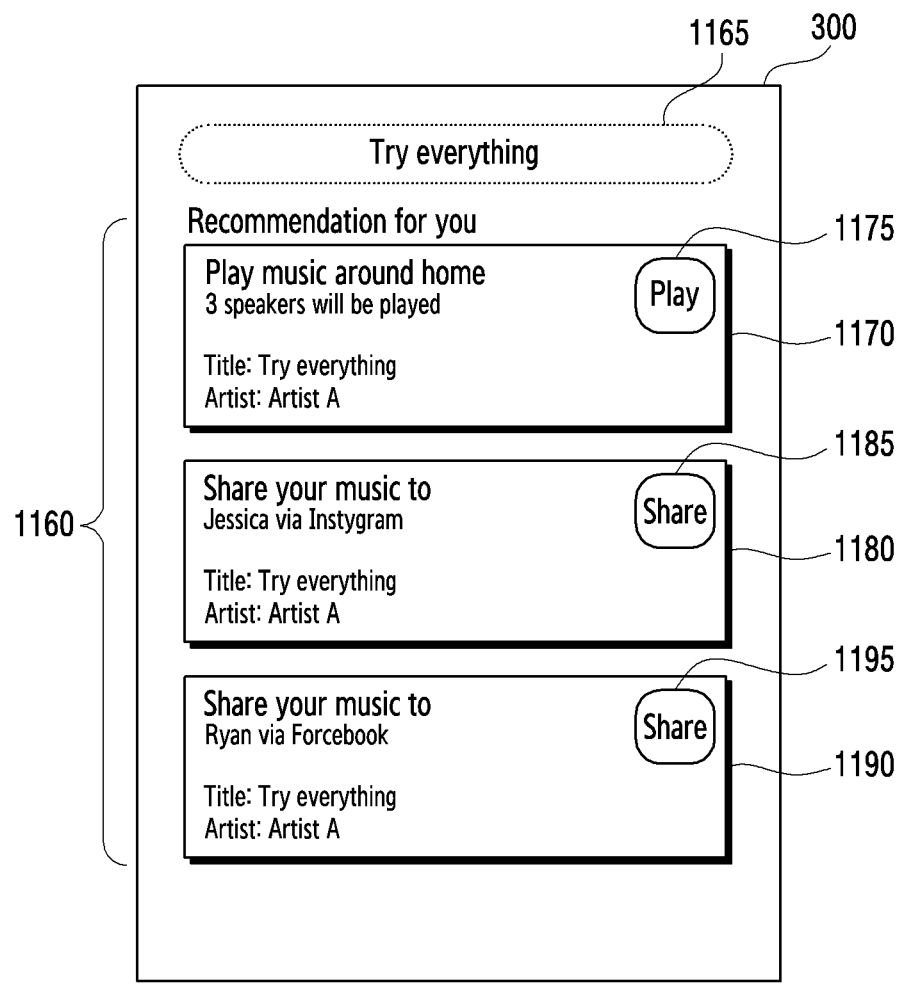

FIGS. 11A and 11B are views illustrating user interfaces according to various embodiments of the disclosure.

FIGS. 11A and 11B are views illustrating user interfaces which are displayed by the electronic device 300 when there are a plurality of recommended applications.

FIG. 11A illustrates a user interface displayed by the electronic device 300 when the user inputs "diapers" as a first input, and FIG. 11B illustrates a user interface displayed by the electronic device 300 when the user inputs "Try Everything" as the first input.

Referring to FIG. 11A, when the user inputs "diapers" as the first input, the electronic device 300 may determine the Amazon application and a music playing application as recommended applications. For example, the electronic device 300 may determine the Amazon application and the music playing application the contextual scores of which exceed a reference value, from among the five first applications.

In an embodiment, the electronic device 300 may display a recommendation search result 1110 and a non-recommendation search result 1120. In an embodiment, the recommendation search result 1110 may correspond to a plurality of areas 1140, 1150 according to the number of recommended applications. For example, the electronic device 300 may display, in the area 1140, an execution icon 1145 of the Amazon application and set values regarding a function (for example, a goods purchasing function) to be performed through the Amazon application, and may display, in the area 1150, an execution icon 1155 of the music playing application and set values regarding a function (for example, a music playing function) to be performed by the music playing application.

Referring to FIG. 11B, when the user inputs "Try Everything" as the first input, the electronic device 300 may determine the music playing application, a first social network service application (for example, the Instagram application), and a second social network service application (for example, the Facebook application) as recommended applications.

In an embodiment, the electronic device 300 may display a recommendation search result 1160. In an embodiment, when the number of recommended applications is larger than or equal to a designated value (for example, 3), the electronic device 300 may not display a non-recommendation search result.

In an embodiment, the recommendation search result 1160 may correspond to a plurality of areas corresponding to the number of recommended applications. For example, the electronic device 300 may display, in an area 1170, an execution icon 1175 of the music playing application and set values (for example, a title and an artist, an output device) regarding a function (for example, playing music) to be performed through the music playing application. For example, the electronic device 300 may display, in an area 1180, an execution icon 1185 of the Instagram application and set values (for example, a title, an artist, and an item to be shared) regarding a function (for example, sharing music) to be performed through the Instagram application. In another example, the electronic device 300 may display, in an area 1190, an execution icon 1195 of the Facebook application and set values regarding a function (for example, sharing music) to be performed through the Facebook application.

Figure 12:
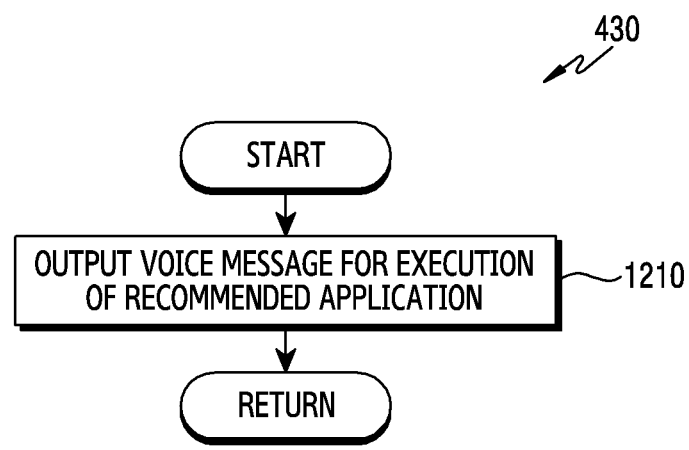
FIG. 12 is a flowchart of an electronic device according to various embodiments of the disclosure.

FIG. 12 is a flowchart of an electronic device according to various embodiments of the disclosure.

An operating entity of FIG. 12 may be an electronic device (for example, the electronic device 300) or the processor 350 of the electronic device 300.

FIG. 12 is a detailed sequence diagram of operation 430 of FIG. 4.

In operation 1210, the electronic device 300 may output a voice message for executing a recommended application. For example, when the electronic device 300 receives a voice message of a user including a query such as "diapers" through a microphone, the electronic device 300 may determine the Amazon application as a recommended application matching the query, and may output a voice message for execution of the Amazon application. When a positive response voice message (for example, "Yes") of the user is received in response to the outputted voice message, the electronic device 300 may execute the Amazon application.

In an embodiment, the electronic device 300 may output a voice message for execution of one recommended application. For example, when there are five first applications, and among these, there are two second applications the contextual scores of which are greater than or equal to a reference value, the electronic device 300 may output a voice message for execution of one recommended application which is determined from the two second applications. For example, a voice message for execution of the application having a higher contextual score from among the two second applications may be outputted.

Figure 13:
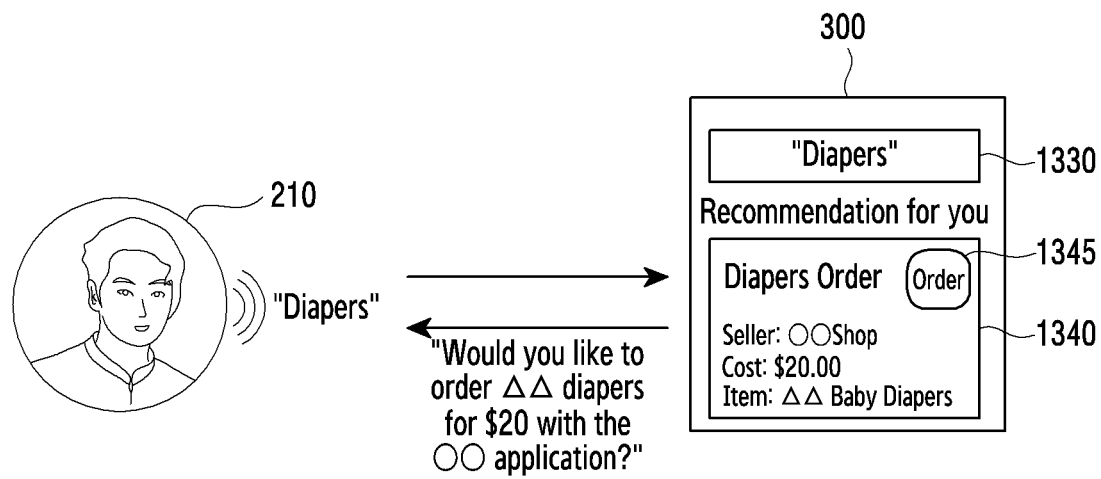
FIG. 13 is a view illustrating an electronic device which outputs a voice message for executing a recommended application in response to a voice input of a user according to various embodiments of the disclosure.

FIG. 13 illustrates an electronic device which outputs a voice message for execution of a recommended application in response to a voice input of a user according to various embodiments of the disclosure.

In an embodiment, the electronic device 300 may receive a voice input from a user through a microphone. For example, the electronic device 300 may receive a voice input of the user including a query such as "diapers." In an embodiment, when the electronic device 300 receives a voice input from the user, the electronic device 300 may display a text corresponding to the voice input in a search window 1330.

In an embodiment, the electronic device 300 may determine one recommended application matching the query. For example, the electronic device 300 may determine the Amazon application as the recommended application.

In an embodiment, the electronic device 300 may determine set values regarding a function to be performed through the Amazon application. In an embodiment, the set value may include a value regarding one or more entities. For example, the electronic device 300 may determine set values regarding an item to be purchased, a cost, a seller, etc. for the goods purchasing function to be performed through the Amazon application.

In an embodiment, the electronic device 300 may generate a voice message to be outputted. In an embodiment, the voice message to be outputted may include information regarding the recommended application to be executed, the function to be performed, and the set values regarding the function to be performed. For example, the voice message to be outputted may be "Would you like to order xx diapers for $20 with the OO application?".

In an embodiment, the information regarding the set values included in the voice message to be outputted may be a portion of information regarding all set values determined by the electronic device 300. For example, when the electronic device determines five set values (for example, values regarding the seller, address, cost, item, payment entities), the voice message to be outputted may include only information regarding two set values (for example, values regarding the cost and item entities).

In an embodiment, the electronic device 300 may display information regarding the recommended application on a screen at the same time as outputting the voice message through the speaker. For example, the electronic device 300 may display, in an area 1340, an execution icon 1345 of the recommended application and information regarding set values regarding the function to be performed through the recommended application. In an embodiment, when a positive response voice message (for example, "Yes") of the user is received in response to the outputted voice message, the electronic device 300 may give an effect as if the execution icon 1345 of the recommended application is touched by the user (for example, changing color of the icon, etc.). In an embodiment, when the voice message is outputted and then a touch input on the execution icon 1345 of the recommended application is detected, the electronic device 300 may execute the recommended application in the same way as when the positive response voice message of the user is received.

Figure 14:
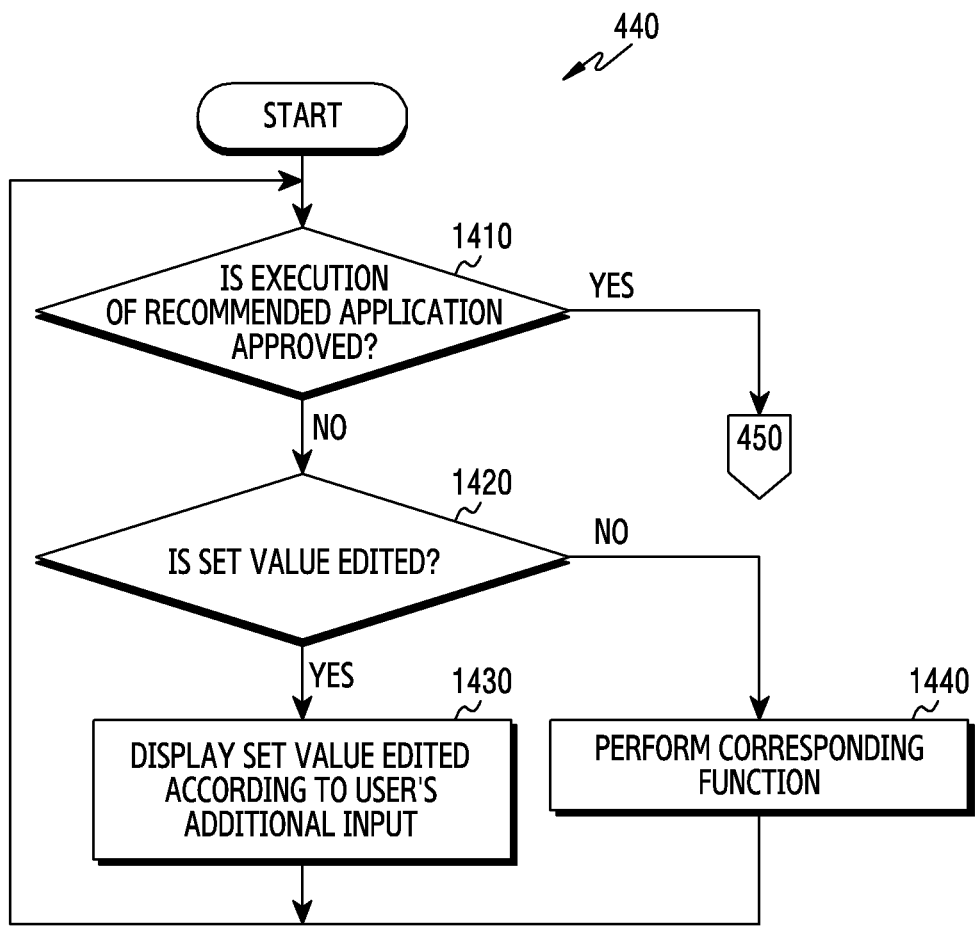
FIG. 14 is a flowchart of an electronic device according to various embodiments of the disclosure.

FIG. 14 is a flowchart of an electronic device according to various embodiments of the disclosure.

An operating entity of FIG. 14 may be an electronic device (for example, the electronic device 300 of FIG. 3) or the processor 350 of the electronic device 300.

FIG. 14 is a detailed sequence diagram of operation 440 of FIG. 4.

In operation 14W, the electronic device 300 may determine whether a second input received from the user is an input of approving execution of a recommended application. For example, when the electronic device 300 displays an execution icon of the recommended application, the electronic device 300 may determine whether a user touch input on the displayed execution icon (for example, the execution icon 1044 of FIG. 10) is detected. In another example, when the electronic device 300 outputs a voice message for execution of the recommended application, the electronic device 300 may determine whether a positive response voice message (for example, "Yes") of the user is received within a designated time from the output.

When the second input received from the user is an input of approving execution of the recommended application, the electronic device 300 may proceed to operation 450 to execute the recommended application.

When the second input received from the user is not the input of approving execution of the recommended application, the electronic device 300 may determine whether the second input is an input for editing set values regarding a function to be performed through the recommended application in operation 1420. For example, the electronic device 300 may determine whether a user touch input on an edit object (for example, the edit object 1046 of FIG. 10) is detected.

When the second input received from the user is not the input for editing the set values, the electronic device 300 may perform the corresponding function in operation 1440. For example, when the second input is a user touch input on a view more object (for example, the view more object 1042 of FIG. 10), the electronic device may display an extended area to display all of the set values regarding the function to be performed through the recommended application.

When the second input received from the user is the input for editing the set values, the electronic device 300 may display a set value which is edited by an additional input of the user. For example, the electronic device 300 may determine an entity to be edited (for example, an address)

according to the user's additional input. The electronic device 300 may newly determine a value regarding the entity to be edited (for example, the address) according to the user's additional input.

In an embodiment, the electronic device 300 may proceed to operation 1410 after performing operation 1430 or 1440. In an embodiment, the electronic device 300 may repeat one or more operations (for example, operations 1410 to 1440) until the input of approving execution of the recommended application is received.

Figure 15:
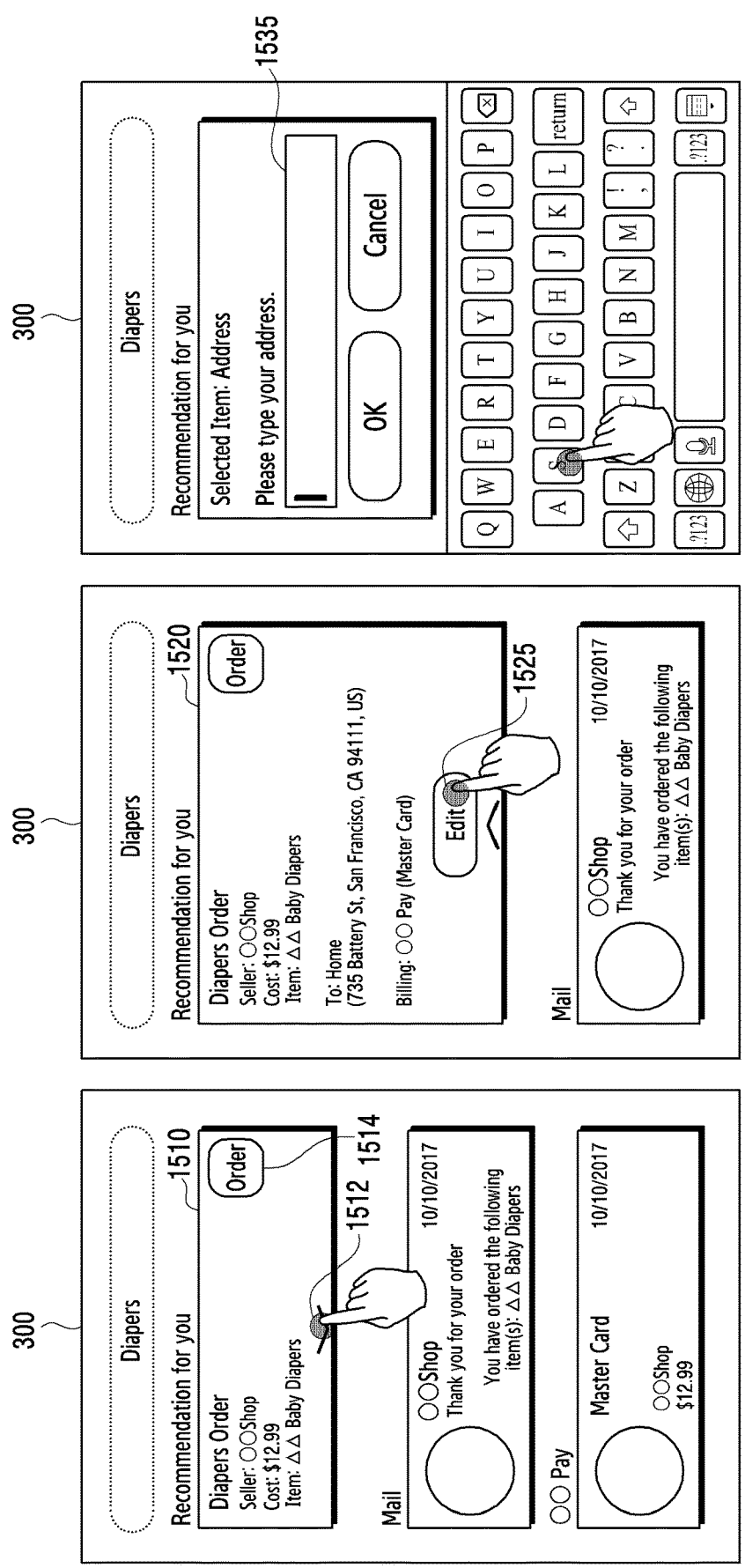
FIG. 15 is a view illustrating user interfaces according to various embodiments of the disclosure.

FIG. 15 is a view illustrating user interfaces according to various embodiments of the disclosure.

In an embodiment, the electronic device 300 may receive a text input including a query such as "diapers" from a user through a search window, and may determine a recommended application matching the query. The electronic device 300 may display an area 1510 in which an execution icon 1514 of the recommended application and one or more objects (for example, text objects indicating a seller, a cost, an item) indicating set values regarding a function to be performed through the recommended application are arranged. The electronic device 300 may display a view more object 1512 in the area 1510 to display information that is not displayed in the current, area 1510.

In an embodiment, when a user touch input on the view more object 1512 is detected, the electronic device 300 may display an extended area 1520 to display all of the set values regarding the function to be performed through the recommended application.

In an embodiment, the electronic device 300 may further display an edit object 1525 to edit the set values regarding the function to be performed through the recommended application.

Although not shown, a plurality of edit objects may be provided. For example, the edit objects may be arranged adjacent to respective entities regarding the function to be performed through the recommended application. For example, when a user touch input on an edit object arranged adjacent to the address entity is detected, the electronic device 300 may display a user interface for receiving an input of a new value regarding the address entity.

In an embodiment, when the user touch input on the edit object 1525 is detected, the electronic device 300 may display a user interface (not shown) for selecting an entity to be edited (for example, the address) from among the plurality of entities (for example, the seller, cost, item, address, payment entities). When a user input of selecting the entity to be edited (for example, the address) is received, the electronic device 300 may display a user interface 1535 to receive an input, of a new value regarding the selected entity (for example, the address). In an embodiment, the electronic device 300 may update the user address stored in the contact, based on the new value inputted to the user interface 1535, or may ask the user about whether to update the user address stored in the contact based on the new value inputted to the user interface 1535.

Figure 16:
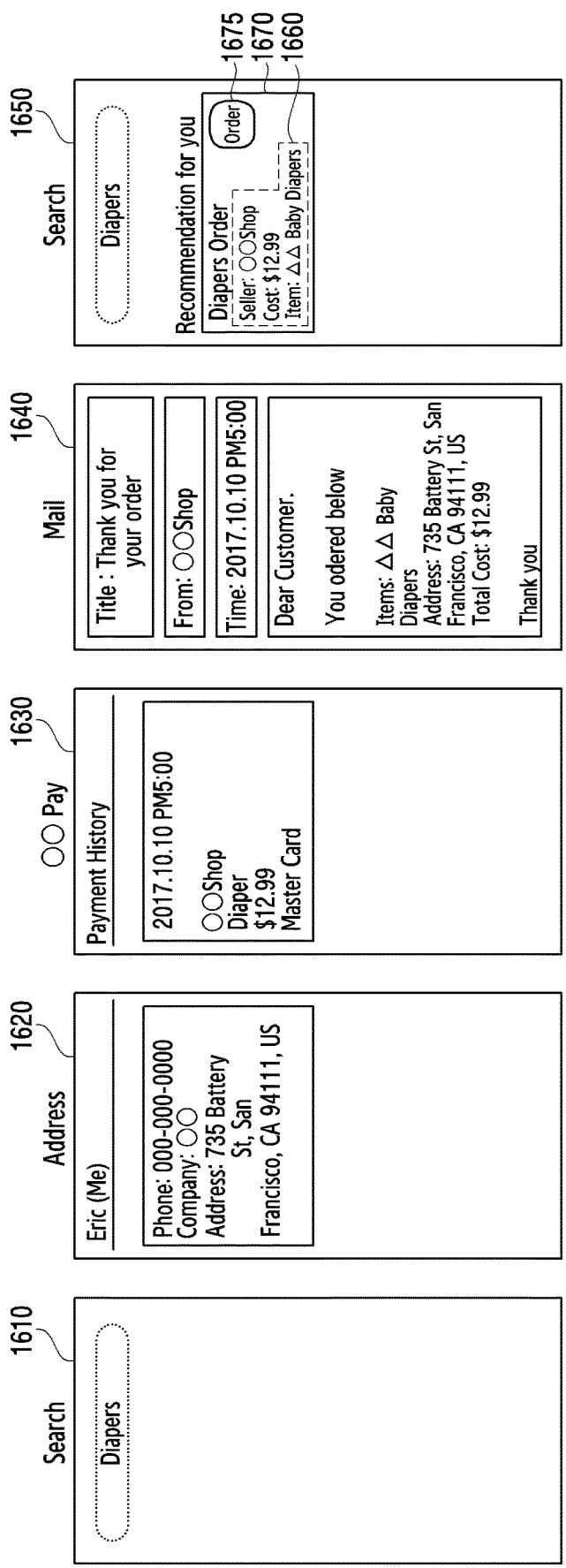
FIG. 16 is a view to explain a process of determining a set value regarding a function to be performed through a recommended application by an electronic device having determined the recommended application according to various embodiments of the disclosure.

FIG. 16 is a view to explain a process of determining set values regarding a function to be performed through a recommended application by an electronic device which determines the recommended application according to various embodiments of the disclosure.

For convenience of explanation, the electronic device may be expressed by an electronic device 1610 to 1650, and the electronic device 1610 to 1650 may be the electronic device 300.

In an embodiment, the electronic device 1610 may receive a text input including a query such as "diapers" from a user through a search window, may determine the Amazon application as a recommended application matching the query, and may determine a goods purchasing function as a function to be performed through the recommended application.

In an embodiment, the electronic device 1610 may determine one or more entities regarding the function to be performed through the recommended application. For example, the electronic device 1610 may receive, from an external device (for example, a server), information of one or more entities regarding the function to be performed through the recommended application. In an embodiment, the one or more entities may be determined according to the function to be performed through the recommended application, or may be determined according to a category of the function to be performed through the recommended application. For example, the electronic device 1610 may determine the category of the function to be performed through the recommended application as a commerce category, and may receive information of one or more entities (for example, a seller, an item, an address, payment, a cost) corresponding to the commerce category from the external device. In an embodiment, the information of the one or more entities received from the external device may be expressed in the form of a template.

The electronic device 1620 to 1640 may determine a value regarding the one or more entities from log data of one or more applications installed in the electronic device.

For example, the electronic device 1620 may obtain address information of the user from log data of contact. The electronic device 1620 may obtain the user's address information by searching user's own entity from among the plurality of entities stored in the contact.

In another example, the electronic device 1630 may determine a value regarding the payment entity from log data of a mobile payment application. The electronic device 1630 may identify a user's history of having used the mobile payment application previously to pay for goods of the Amazon application, by searching payment history data of the mobile payment application. For example, the electronic device 1630 may identify a history indicating that the user purchased diapers for 12.99 dollars with the Amazon application previously (for example, 5 μm on Oct. 10, 2017), and paid for the goods with a user's Master card, and may determine information regarding the user's Master card (for example, a credit card number, a password, etc.) as a value regarding the payment entity.

In another example, the electronic device 1640 may determine values regarding the seller, item, cost entities from log data of a mail application. For example, when the user has a history of having purchased diapers with the Amazon application previously, and a diaper purchase confirmation mail is included in log data of the mail application, the electronic device 1640 may obtain information regarding the item previously purchased, seller, and cost from the diaper purchase confirmation mail. The electronic device 1640 may determine values regarding the seller, item, cost entities on the basis of the obtained information.

In an embodiment, the electronic device 1650 may display an execution icon 1675 of the recommended application. In an embodiment, when values of all entities regarding the function to be performed through the recommended application are determined (or set), the electronic device 1650 may display the execution icon 1675 of the recommended application. In an embodiment, the electronic device 1650 may display one or more objects 1660 indicating values of some entities regarding the function to be performed through the recommended application, along with the execution icon 1675. In an embodiment, the electronic device 1650 may display the execution icon 1675 and one or more objects 1660 indicating values of some entities in one independent area 1670.

Figure 17:
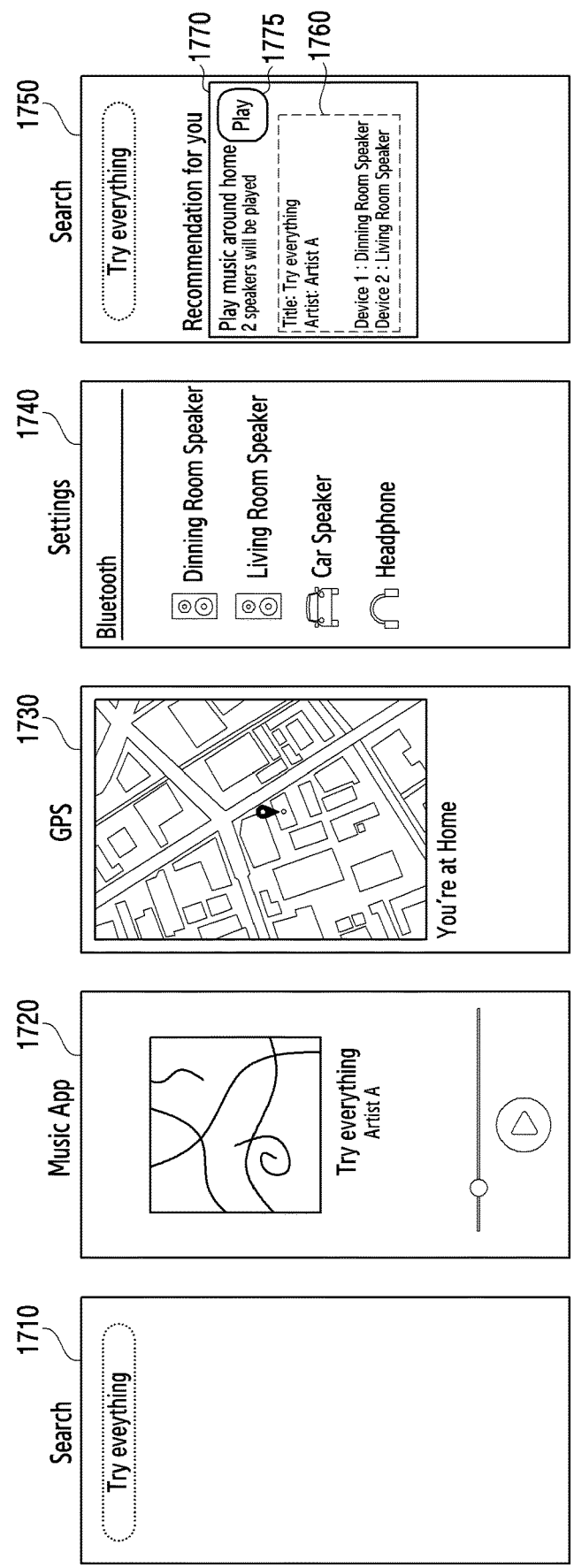
FIG. 17 is a view to explain a process of determining a set value regarding a function to be performed through a recommended application by an electronic device having determined the recommended application according to various embodiments of the disclosure.

FIG. 17 is a view to explain a process of determining set values regarding a function to be performed through a recommended application by an electronic device which determines the recommended application according to various embodiments of the disclosure.

For convenience of explanation, the electronic device may be expressed by an electronic device 1710 to 1750, and the electronic device 1710 to 1750 may be the electronic device 300.

In an embodiment, the electronic device 1710 may receive a text input including a query such as "Try Everything" from a user through a search window.

In an embodiment, the electronic device 1720 may determine a music playing application as a recommended application matching the query. The electronic device 1720 may give a contextual score to each of a plurality of first applications literally matching the query, according to whether each application satisfies a predetermined criterion. For example, when the number of times of playing the music "Try Everything" by the music playing application exceeds a reference value, the electronic device 1720 may give a contextual score of 60 to the music playing application. The electronic device 1720 may determine the music playing application having the highest contextual score from among the plurality of first applications, as the recommended application. The electronic device 1720 may determine a music playing function as a function to be performed through the recommended application.

In an embodiment, the electronic device 1720 may determine one or more entities regarding the function to be performed through the recommended application. For example, the electronic device 1610 may determine a category of the function to be performed through the recommended application as a music category, and may determine one or more entities (for example, a title, an artist, an output device) corresponding to the music category.

In an embodiment, the electronic device 1730 may determine values regarding the one or more entities, on the basis of sensing information obtained from one or more sensors included in the electronic device 1730. For example, the electronic device 1730 may determine a value regarding the output device entity, on the basis of position information of the electronic device 1730 which is obtained from a GPS sensor. When the current position of the electronic device 1730 is home, the electronic device 1730 may set one or more devices designated (or positioned) in user's home as the output device. For example, the electronic device 1740 may determine a currently available Bluetooth output device by searching Bluetooth connection history information stored in the memory 340. The electronic device 1740 may determine two devices designated in user's home (for example, a dining room speaker, a living room speaker) as a value regarding the output device entity.

In an embodiment, the electronic device 1750 may display an execution icon 1705 of the recommended application. In an embodiment, the electronic device 1750 may display one or more objects 1760 indicating values of some entities regarding the function to be performed through the recommended application, along with the execution icon 1775. For example, the electronic device 1750 may display the execution icon 1775 and a text object indicating the output device in one independent area 1770.

In an embodiment, when a touch input on the execution icon 1705 of the recommended application is detected, the electronic device 1750 may execute the recommended application by using the values regarding the one or more entities. For example, the electronic device 1750 may output the music "Try Everything" through the dining room speaker and the living room speaker.

Embodiments disclosed the detailed descriptions and the drawings of the disclosure only suggest specific examples to assist in explaining and easily understanding the contents of the disclosure, and are not intended to limit the scope of the disclosure. Therefore, the scope of the disclosure will be construed as including not only the embodiments disclosed herein, but also all changes derived based on the technical concept of the disclosure or changed forms.

What is claimed is:

1. An electronic device comprising:
a processor;
a memory operatively connected with the processor,
wherein the memory is configured to store instructions that, when being executed by the processor, cause the processor to control the electronic device to:
receive a first input comprising a query;
identify at least one first application from among a plurality of applications installed in the electronic device by performing a first matching of text included in the query, wherein the first matching indicates determining the at least one first application in which the text is included in log data of the plurality of applications;
identify at least one second application from among the at least one first application by performing a second matching of the text included in the query, the second matching being different from the first matching, wherein the second matching indicates determining the at least one second application in which contextual scores of the at least one first application is greater than or equal to a reference value;
determine at least one recommended application from among the at least one second application based on a number of the at least one second application;
determine a first function from among a plurality of functions to be performed by the at least one recommended application based on usage history for the plurality of applications;
receive a second input for selecting at least one recommended application;
output a confirmation message requesting confirmation of execution of the at least one recommended application;
receive a third input confirming execution of one of the at least one recommended application; and
execute the one recommended application to perform the first function based on the third input.

2. The electronic device of claim 1, wherein any one of the first input, the second input, or the third input is at least one of a touch input or a voice input.

3. The electronic device of claim 1, wherein:
the first matching comprises literal matching of the text included in the query; and
the second matching comprises contextual matching of the text included in the query.

4. The electronic device of claim 3, wherein the instructions, when being executed, cause the processor to control the electronic device to provide the contextual score to each of the first applications, and to identify, as the at least one second application, any of the first applications having a contextual score greater than or equal to the reference value.

5. The electronic device of claim 4, wherein the instructions, when being executed, cause the processor to control the electronic device to provide contextual scores according to whether each of the first applications satisfies at least one criterion, and
wherein the at least one criterion comprises at least one of whether a matching relationship with the query is already set, whether a frequency of searching or using exceeds a reference value, whether an application is used within a designated period, or whether a history using the query exists.

6. The electronic device of claim 1, wherein the instructions, when being executed, cause the processor to control the electronic device to identify one or more entities regarding a function to be performed using the at least one recommended application, and to identify values of the one or more entities based on the log data of one or more of the plurality of applications.

7. The electronic device of claim 6, wherein the instructions, when executed, cause the processor to control the electronic device to receive a template comprising the one or more entities from an external device.

8. The electronic device of claim 1, wherein the confirmation message comprises at least one of an execution icon of a respective recommended application displayed on a display of the electronic device or a voice message for execution of a respective recommended application output by a speaker of the electronic device.

9. The electronic device of claim 1, wherein the confirmation message comprises an execution icon of a respective recommended application and one or more objects indicating values of one or more entities displayed on a display of the electronic device.

10. The electronic device of claim 9, wherein the instructions, when executed, cause the processor to control the electronic device to receive an input for changing a value of at least one entity from among the one or more entities, and to display at least one object indicating a changed value.

11. A method for an electronic device, the method comprising:
receiving, by the electronic device, a first input comprising a query;
identifying, by the electronic device, at least one first application from among a plurality of applications installed in the electronic device by performing a first matching of text included in the query, wherein the first matching indicates determining the at least one first application in which the text is included in log data of the plurality of applications;
identifying, by the electronic device, at least one second application from among the at least one first application by performing a second matching of the text included in the query, the second matching being different from the first matching, wherein the second matching indicates determining the at least one second application in which contextual scores of the at least one first application is greater than or equal to a reference value;
determining at least one recommended application from among the at least one second application based on a number of the at least one second application;
determining a first function from among a plurality of functions to be performed by the at least one recommended application based on usage history for the plurality of applications;

receiving, by the electronic device, a second input for selecting at least one recommended application;
outputting, by the electronic device, a confirmation message requesting confirmation of execution of the at least one recommended application;
receiving, by the electronic device, a third input confirming execution of one of the at least one recommended application; and
executing, by the electronic device, the one recommended application to perform the first function based on the third input.

12. The method of claim 11, wherein any one of the first input, the second input, or the third input is at least one of a touch input or a voice input.

13. The method of claim 11, wherein:
the first matching comprises literal matching of the text included in the query; and
the second matching comprises contextual matching of the text included in the query.

14. The method of claim 13, wherein determining the second application from among the first applications by performing the contextual matching comprises:
providing, by the electronic device, a contextual score to each of the first applications; and
identifying, by the electronic device, as the at least one second application, any of the first applications having a contextual score greater than or equal to the reference value.

15. The method of claim 14, wherein contextual scores are provided according to whether each of the first applications satisfies at least one criterion, and
wherein the at least one criterion comprises at least one of whether a matching relationship with the query is already set, whether a frequency of searching or using exceeds a reference value, whether an application is used within a designated period, or whether history of using the query exists.

16. The method of claim 11, further comprising:
identifying, by the electronic device, one or more entities regarding a function to be performed using the at least one recommended application, and
identifying, by the electronic device, values of the one or more entities based on the log data of one or more of the plurality of applications.

17. The method of claim 16, further comprising:
receiving, by the electronic device, a template comprising the one or more entities from an external device.

18. The method of claim 11, wherein the confirmation message comprises at least one of an execution icon of a respective recommended application displayed on a display of the electronic device or a voice message for execution of a respective recommended application output by a speaker of the electronic device.

19. The method of claim 11, wherein the confirmation message comprises an execution icon of a respective recommended application and one or more objects indicating values of one or more entities displayed on a display of the electronic device.

20. The method of claim 19, further comprising:
receiving, by the electronic device, an input for changing a value of at least one entity from among the one or more entities, and
displaying, by the electronic device, at least one object indicating a changed value.

* * * * *